(12) United States Patent
Clausen et al.

(10) Patent No.: US 11,222,443 B2
(45) Date of Patent: Jan. 11, 2022

(54) IMAGE COMPRESSION USING IMAGE ACQUISITION DEVICE CHARACTERISTICS

(71) Applicant: DOTPHOTON AG, Zug (CH)

(72) Inventors: Christoph Clausen, Gramatneusiedl (AT); Bruno Sanguinetti, Zug (CH)

(73) Assignee: Dotphoton AG, Zug (CH)

( * ) Notice: Subject to any disclaimer, the term of this patent is extended or adjusted under 35 U.S.C. 154(b) by 8 days.

(21) Appl. No.: 16/831,359

(22) Filed: Mar. 26, 2020

(65) Prior Publication Data

US 2020/0320745 A1    Oct. 8, 2020

Related U.S. Application Data

(60) Provisional application No. 62/827,882, filed on Apr. 2, 2019.

(51) Int. Cl.
| | | |
|---|---|---|
| *G06K 9/36* | (2006.01) | |
| *G06T 9/00* | (2006.01) | |
| *G06T 7/80* | (2017.01) | |
| *G06T 7/00* | (2017.01) | |

(52) U.S. Cl.
CPC .............. *G06T 9/00* (2013.01); *G06T 7/0002* (2013.01); *G06T 7/80* (2017.01)

(58) Field of Classification Search
CPC .... G06T 9/20; G06T 7/50; G06T 7/13; G06T 3/602; G06T 9/00; G06T 7/80; G06T 7/0002; H04N 19/00278; H04N 19/00951; H04N 7/26; H04N 19/00587; H04N 19/0063; H04N 5/23251; H04N 19/136; H04N 19/124; G06K 9/36
See application file for complete search history.

(56) References Cited

U.S. PATENT DOCUMENTS

| | | | |
|---|---|---|---|
| 6,018,362 A | 1/2000 | Suzuki et al. | |
| 6,215,907 B1 * | 4/2001 | Kumar ................... | H03M 7/30 |
| | | | 375/E7.048 |
| 10,063,891 B2 | 8/2018 | Martin et al. | |
| 2014/0101485 A1 | 4/2014 | Wegener | |

(Continued)

FOREIGN PATENT DOCUMENTS

JP    2003-179926 A    6/2003

OTHER PUBLICATIONS

Thai, Thanh Hai, "Camera Model Identification Based on the Heteroscedastic Noise Model," IEEE Transactions on Image Processing, vol. 23, No. 1, pp. 250-263. (Jan. 2014).

(Continued)

*Primary Examiner* — Duy M Dang
(74) *Attorney, Agent, or Firm* — Christensen, Fonder, Dardi & Herbert PLLC

(57) ABSTRACT

A system and method to compress image data by first identifying the device and settings with which the image data was generated, and then optimizing the compression accordingly. A catalogue that associates imaging devices and settings to compression parameters is generated, so that when an image needs to be compressed, the system will identify the device and settings and extract compression parameters from the catalogue. These parameters are used during compression to achieve higher compression performance and optionally to normalize the compressed data as to make it more homogenous for further processing.

15 Claims, 4 Drawing Sheets

(56) References Cited

U.S. PATENT DOCUMENTS

2017/0359478 A1* 12/2017 Deshpande ......... H03M 7/3064
2019/0043201 A1* 2/2019 Strong ............... G06K 9/00624

OTHER PUBLICATIONS

Anonymous, "Camera RAW files formats explained," retrieved from internet: https://www.orpalis.com/blog/camera-raw-files-formats-explained/, 4 pages (Apr. 12, 2002).

Lukáš, Jan, et al., "Digital Camera Identification From Sensor Pattern Noise," IEEE Transactions on Information Forensics and Security, vol. 1, No. 2, pp. 205-214 (Jun. 2006).

Decaillet, Quentin, "Dotphoton Raw Makes Raw Quality with JPEG File Size a Reality," Fstoppers, retrieved from internet: https://fstoppers.com/originals/dotphoton-raw-makes-raw-quality-jpeg-file-size-reality-37153, 9 pages (May 28, 2019).

* cited by examiner

Fig. 3

| Image Acquisition device | Acquisition setting 1 (e.g. ISO) | Compression parameter 1 (e.g. lookup table) | ... |
|---|---|---|---|
| e.g. Canon EOS 5D mkii | e.g. 100 | e.g. [100, 110, 130, 180, ...] | ... |
| e.g. Canon EOS 5D mkii | e.g. 200 | e.g. [100, 120, 160, 200, ...] | ... |
| e.g. Nikon D700 | ... | ... | ... |
| ... | ... | ... | ... |

| Image acquisition device | Acquisition setting 1 (e.g. ISO) | Acquisition setting 2 (e.g. Exposure time) | Compression parameter 1 (e.g. gain) | Compression parameter 2 (e.g. offset) | Compression parameter 3 (e.g. readout noise) | ... |
|---|---|---|---|---|---|---|
| E.g. Canon EOS 5D mk ii | e.g. 100 | e.g. 1/20 | e.g. 1.456 | e.g. 100.0 | e.g. 23 | ... |
| ... | ... | ... | ... | ... | ... | ... |
| ... | ... | ... | ... | ... | ... | ... |

IMAGE COMPRESSION USING IMAGE ACQUISITION DEVICE CHARACTERISTICS

RELATED APPLICATIONS

This application claims the benefit of U.S. Provisional Patent Application No. 62/827,882, filed Apr. 2, 2019, which is incorporated herein in its entirety.

FIELD OF THE INVENTION

The present invention relates generally to the field of image compression and decompression, and more particularly to a technique for taking the specific characteristics of the image acquisition device into account to better achieve image compression targets, such as file size and quality.

BACKGROUND OF THE INVENTION

The possibility to reduce storage and bandwidth requirements by compressing image data files is an enabling factor for many technologies and applications. Various methods are currently in use for analyzing and compressing image files, and the fact that new applications apply processing of increasing complexity to a growing number of files provides a constant need for innovation.

The importance of image compression can also be seen from the large number of existing algorithms. They usually consist of two steps. The aim of the first step is generally to distill the image data in such a way that those parts that are considered useful are kept and useless parts are discarded. The distinction between useful and useless depends on the application at hand. The second step, called entropy coding, encodes the distilled data in as few bits as possible while allowing for perfect reconstruction. In the ubiquitous JPEG standard, the first step is implemented by dividing the image into blocks and applying a discrete cosine transform to the data of each block. The compression is intended to respect the quality requirements of the human visual system, which tends to favor low-frequency components of the image. Hence, a quantization is applied that retains more information of the low-frequency components than the high-frequency components, and the relative weight of the frequency components is often related to a so-called quality parameter that can be set by the user. The second step is implemented by putting the quantized components in a specific order and applying a Huffman coding to the differences between neighboring elements. Other compression algorithms use different transformations, e.g., based on wavelets or fractals, and different types of entropy coding, but the principles are very similar.

In image compression a compromise must be made between image quality, as defined by some kind of measure, and file size. No single algorithm can guarantee optimal results under all conditions. Instead, the various compression algorithms are often specialized towards specific conditions, which allows obtaining favorable outcomes in terms of file size and quality by fine-tuning the algorithms for the particular conditions under consideration. Examples are algorithms that work better for grayscale images compared to color images, or algorithms that work well for computer-generated images but not for photos.

It is clear that choosing the optimal algorithm for a given situation is an extremely challenging task which, preferably, should be executed in an automated fashion. The situation is even more complicated, because each compression algorithm has one or more parameters that influence the outcome. Many methods exist that are supposed to make the right choice of compression algorithm and/or parameters, such as disclosed for example in the U.S. Pat. No. 6,031,939. These methods usually work on an image-by-image basis, where the image to be compressed is first analyzed. This analysis can be as simple as determining the file type from the file extension. Sophisticated methods extract characteristics from the image itself, such as color or noise distributions, or of the content of the image, for example, whether the image is taken outdoors or indoors, or if it contains specific items such as human faces. Compression algorithm and parameters are then chosen according to the outcome of this analysis—some methods even compress different parts of the image by different means—and according to specific quality and/or file size targets and the intended use of the image.

SUMMARY OF THE INVENTION

It is an objective of the present invention to take into account the hardware that was used to acquire the image, this being one aspect that prior art does not use for choosing compression algorithms and parameters. The inventors have found that knowledge about the hardware allows to significantly improve compression results. Knowing, for example, the camera make and model allows to clearly identify, for example, the image sensor that is employed in the device. This means that important properties of the image can be taken into account, such as the original dimensions in pixels, bit depth of the pixels, color filter array of the sensor, sensitivity, amplification, etc. All these parameters are important for the creation of the image, and hence also for compression, in particular if one of the targets of the compression is a quantifiable information loss, such as disclosed for example in the U.S. Pat. No. 10,063,891.

It is another objective of the present invention, in order to apply optimized image compression, to identify both the hardware and the settings that were used to acquire the image. Furthermore, it is another objective of the present invention to be able to make an automatic selection of compression algorithm and/or parameters based on this identification.

The present invention provides an image data compression solution designed to respond to these needs and objectives. The technique according to the present invention is applicable to a wide variety of imaging fields. It is particularly well suited for the compression of so-called raw image and video data that have not been subject to any processing in order to make the data suitable for viewing or distribution. Furthermore, the technique according to the present invention is particularly well suited for compression where the target is a quantifiable information loss. Compression in accordance with the technique is based upon reference to a set of compression parameters, such as quantization tables or compression code tables, which are predefined to accommodate different image-data characteristics, which can in some way be traced back to the properties and settings of the hardware used to acquire the image data.

Specifically, compression in accordance with the invention comprises the creation of a compression parameter catalogue. Compression then proceeds in three steps: image sensor identification, parameter determination based on said catalogue, and actual compression using the said parameters.

In an embodiment, an image is compressed by first identifying the device and settings used to acquire the image. In this embodiment, this identification can be performed in several ways. One way of identification is to analyze the metadata that is provided together with the image data, either in the same file or in an accompanying file or other data structure. Another way of identification is based on the analysis of the image data itself. This includes analysis of the image format, analysis of the statistics of the image data, as well as other means of gaining knowledge about the hardware and its sensor, such as the identification of fixed pattern noise, photoresponse non-uniformity, etc. Another way of identification is via user input, e.g., by letting the user choose from a list of devices and settings. In one embodiment, the result of the identification is a particular device as identified, e.g., by a serial number or similar. In another embodiment, not a particular device is identified, but a family of devices with similar or identical properties, such as all cameras with a specific type of imaging sensor.

This embodiment then proceeds by selecting a compression method and associated parameters based on the identified device and settings. The compression method and parameters can, e.g., be directly selected from a local or remote database by performing the corresponding query. The compression method and parameters can also be indirectly selected by retrieving from the database a mathematical function and/or secondary parameters, from which it is possible to compute the compression method and parameters.

Finally, this embodiment compresses the image data at hand by application of the selected compression method and associated parameters.

BRIEF DESCRIPTION OF THE DRAWINGS

The attached figures exemplarily and schematically illustrate the principles as well as several embodiments of the present invention.

FIG. 3 illustrates a possible realization of the compression parameter catalogue.

DETAILED DESCRIPTION

In the following, the invention shall be described in detail with reference to the above mentioned figures.

The embodiment described below is meant as an example and concerns the compression of still images. A person of ordinary skill in the art will easily be able to adapt this example to the compression of videos and other specialized image formats. In what follows, the terms "imaging device", "image sensor", "image acquisition device", "imaging system" and "imaging hardware" will be used interchangeably as such a skilled person will realize that they are equivalent for the purpose of the invention, and the most adequate term depends on the specific application.

The main aim of the invention is to obtain optimal compression of an image by taking into account the specific hardware and hardware settings that were used to obtain the image and a user-defined bound on the acceptable information loss for compression. First, the general principles of the invention are described. Detailed descriptions and examples of various aspects of the method are given later.

Figure 1:
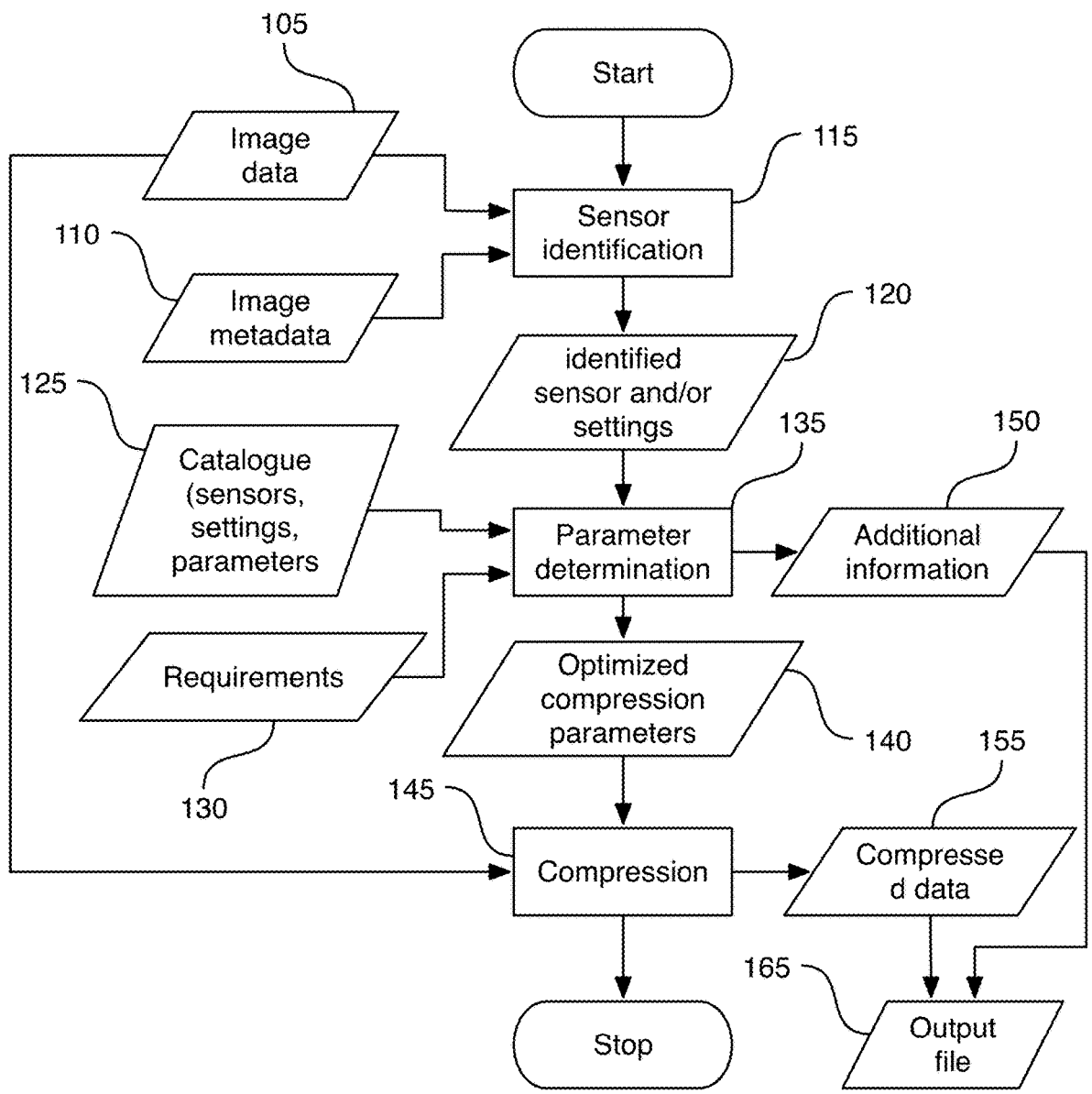
FIG. 1 illustrates the general principle of the invention.

The method to provide compression that is optimized for specific hardware and hardware settings proceeds in three or four steps, as described in FIG. 1: Initialization (optional), sensor identification 115, parameter determination 135 and compression 145.

The aim of the initialization step is to construct a catalogue 125, such as illustrated in FIG. 3 showing an example of such a catalogue, or a similar database that relates an image acquisition device 205 and its settings 215 and, optionally, a number of additional requirements 130 to their associated optimal compression parameters 230. To do so, for each image acquisition device under consideration one needs to perform a system calibration 210 as described in the parameter determination phase of the above-mentioned U.S. Pat. No. 10,063,891. The system calibration 210 allows calculation of the information loss in the steps that follow and may be repeated for each setting of the image acquisition device that can affect the information content of the image. Next, the calibration output is combined with all possible combinations of compression requirements (for example a bound on information loss) in an analysis step 225. The output of the analysis step is a set of compression parameters 230 that will give optimal compression for the given image acquisition device and settings while respecting the compression constraints.

The overall output of the initialization is a catalogue 125 which is comprised of all the optimal compression parameters 230 for all image-acquisition devices 205 and their associated settings 215. The catalogue 125 allows to look up a set of optimal compression parameters as a function of image acquisition device and settings and of a set of requirements. The skilled person will understand that it is sufficient to perform the initialization only once for a fixed set of image acquisition devices and compression constraints as long as the resulting catalogue is accessible by the part of the invention that performs compression. This can be realized, for example, by distributing copies of said catalogue, or by making it accessible through an internet connection.

After initialization, the remainder of the invention is concerned with the selection of compression parameters 135, and with the actual compression 145. For the selection of compression parameters, optional compression requirements 130 can be specified beforehand for a given application, or they can be chosen by the user. In addition, an identification step 115 is performed that serves to exactly determine the image acquisition device and settings.

Overview

FIG. 1 gives an overview of the preferred implementation of this method. It will briefly be described here before going into details of each component.

A first step 115 consists of sensor identification. This step accesses image data and/or metadata and outputs the sensor and/or settings 120 that were used to generate the image.

Figure 2:
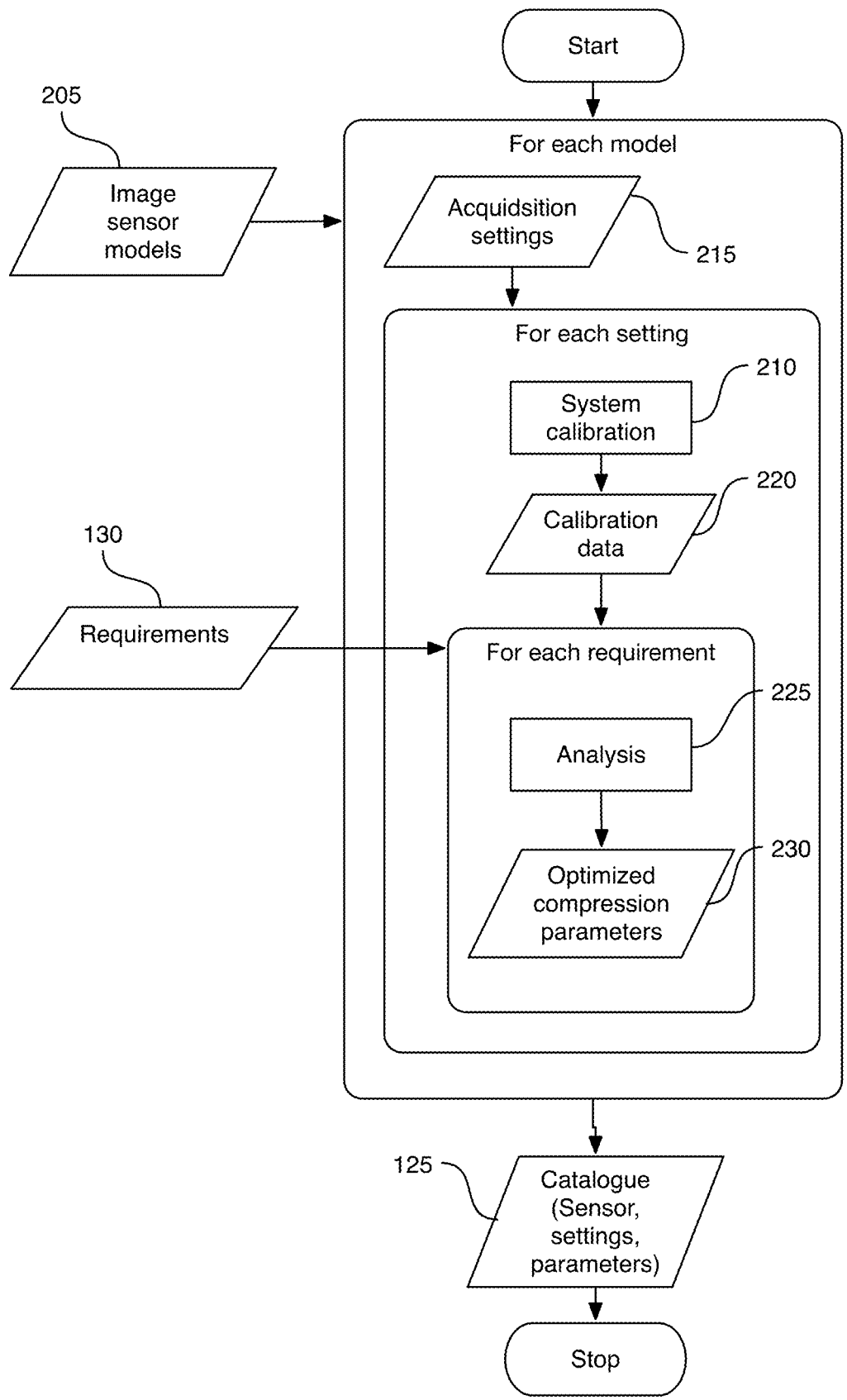
FIG. 2 is a flowchart that shows a possible embodiment of catalogue creation in accordance with the invention.

A second step consists of a "compression algorithm and parameter determination step" 135 which uses the identified sensor and/or settings 120 to extract relevant information from a catalogue 125, which it uses together with requirements 130 to determine a compression algorithm and corresponding compression parameters that are deemed optimal 140. FIG. 2 describes how the catalogue 125 is generated. Optionally, the parameter determination step outputs additional information 150, which may be used in post-processing or written to file 160 for later use.

A third step consists of a compression step 145 which takes the optimized compression algorithm and corresponding parameters and image data 105 as input and outputs compressed image data 155, which is combined with additional information 150 into an output file 165 ready for storage or transfer.

Initialization

The above-mentioned U.S. Pat. No. 10,063,891 discloses an image compression method providing high compression with minimal information loss. The authors distinguish the amount of image information from the amount of image data. Information is the useful knowledge acquired about the photographed object by means of the imaging device. Data is the digital representation of the measurement result and contains information as well as noise and redundancy. The noise manifests itself as a finite standard deviation of the value of any pixel for a collection of images taken under identical conditions. The amount of image information lost can be characterized as the increase in the uncertainty caused by compression. This increase depends on the combination of compression parameters and sensor settings. During the initialization, this dependency is analyzed and the result used to determine the best possible compression parameters, namely the parameters which achieve the strongest compression for the lowest possible information loss.

In an embodiment, the initialization step, schematically shown in FIG. 2, provides a catalogue 125 of optimal compression parameters, or other entries from which appropriate compression parameters may be derived at a later stage, for example, during the "compression parameter determination" step. In this implementation, these compression parameters correspond to an optimal quantization table directly or to the relevant sensors values from which such table may be derived, for example sensor gain, offset, black level, readout noise.

The catalogue 125 contains entries for each imaging device, in general, for which compression shall be provided. For some applications, an imaging device is defined by the make and model of the photographic camera, of the mobile phone, of the microscope model, or of some other device of interest that acquires digital images. For some applications, the imaging device is defined as a family of image sensors of the same type. Finally, for some applications the catalogue will contain an entry for each individual sensor as identified by, e.g., its serial number.

For each imaging device 205, or family of imaging devices, the catalogue in an embodiment will contain an entry for each combination of acquisition settings 215 that can affect image information content. Examples of device settings are the gain of the image sensor and/or associated analog-to-digital converters (ADC), the bit depth of the ADC, the ISO setting of the device, the read-out speed, application of de-noising or other kind of processing, etc.

In addition, and unrelated to the device and its settings, the application for which a given embodiment is used may have a number of constraints and requirements 130 which are known beforehand. Examples hereof are that the output of the compression must be compatible with a given file format, which in turn dictates a limited set of possible compression algorithms and parameters. Other examples are requirements for the power consumption of the compression, which puts limits on the computational complexity, or for the compression throughput (in pixels per second). Finally, a common example of a constraint is the amount of image information lost, which typically should stay below a given limit.

Sensor Identification

A given image 105 is compressed 145 in accordance with the present invention by looking up the compression parameters, or parameters allowing to compute said compression parameters, in the catalogue 125 based on the imaging device and/or settings 120 that can be identified as having been used to acquire the image. In an embodiment, several methods can be used to identify 115 which imaging device, or type of imaging device and/or settings acquired the image.

In one embodiment, the user directly selects or inputs the type of imaging device, e.g. by choosing from a list of devices. Similarly, the user can choose (or select) a combination of device settings that are relevant for the image or image set that are to be compressed.

In another embodiment, the file that stores the image data is inspected for metadata 110. The device make and model, as well as other information necessary to retrieve the compression parameters from the catalogue are extracted or reconstructed with the help of said metadata, such as shown schematically and by way of example in FIG. 1. The same procedure can be applied if the metadata is not stored in the same file as the image data, but is stored, for example, in a separate file, in a database, etc.

If, in another embodiment, metadata is not available, an attempt at identifying imaging device and settings can be made, where the image data 105 itself is processed and analyzed. For example, the image dimensions (number of pixels horizontally and vertically) can give a good indication of what image sensor was used. Another example would be an analysis of the particular noise structure of the image (signal dependent noise, fixed pattern noise, etc.), which could help identify the image sensor and settings.

Compression Parameter Determination

Once the device and settings with which the image was taken have been identified or estimated in the previous identification step 115, the embodiment will read the catalogue 400 entry 415, 455 relating to the identified device 410, 450 and settings 420, 455 to extract the optimal compression parameters. For example, this could be extracting the optimal quantization table 430 directly from the catalogue entry, or the relevant parameters such as gain 465, offset 470 and readout noise 475 from which the optimal quantization table can be determined.

Another embodiment generates compression parameters that are deemed to be optimal considering the current requirements of the user or application, by computing them as a function of both the retrieved parameters 125 (for the determined sensor and/or settings) and the current requirements 130. In this embodiment the user may chose, for example, to sacrifice the amount of retained image information to achieve a smaller size of the compressed image, the compression parameters are then determined to optimize compression under these requirements.

Other compression parameters, unrelated to the identified imaging device and settings may optionally be determined by the user, for example, relating to the compression speed (complexity), or desired output file format.

As an optional, but useful, feature, the compression parameters may also be determined (or initialized) as to normalize the compressed data according to a specific requirement. For example, having access to the retrieved gain 465 and offset 470 with which the image was taken, allows this process to encode the output data such that each digital number represents the number of photons that have been absorbed by each individual pixel. This has the advantage of making several images, taken with different sensors or settings, behave more uniformly under post-processing. Compression parameters may be determined to normalize other properties of the image besides pixel value, for example in the preferred implementation data is normalized such that the variance of quantized values is approximately constant, so that not only the pixel value may be determined from the compressed data, but also the associated uncertainty. This is of particular interest in a variety of technical fields where considerable effort is put into developing advanced post-processing algorithms that typically need to be re-qualified when their input is data from different sensors. Normalizing the data as described here reduces the time that it takes to re-qualify algorithms, allowing companies a faster time-to market, or to change imaging devices with low risk of adverse effects from differences between devices.

The parameter determination step may optionally output additional information, to which it has access or that it can compute, that may be used in downstream processing by this or other methods, or integrated in an output file. This may include metadata or other information from the catalogue. For example, this implementation outputs a look-up-table that maps the normalized pixel values to values close to the original image pixel values. This lookup table may be included in the compressed output file as metadata so that downstream applications may use it.

Compression

The compression parameters having been determined according to the process described above, they may now be employed to compress image data.

In an embodiment, these parameters 140 are directly used by the compression element 145 of the compression step of the method, for example the parameters may be the quantization table 430 that is applied to the image data.

In another embodiment, the image is pre-processed using the compression parameters so that a standard compression element (for example LZW, or JPEG-LS, or lossless-JPEG) may thereafter more efficiently compress the image data.

Finally, the compressed data 155 is output for storage or transmission 165, and optionally combined with additional information (metadata) 150 that may be made use of for later processing.

The present invention also pertains to computer program means stored in a computer readable medium adapted to implement the method according to the present invention and described here above in detail.

Figure 4:
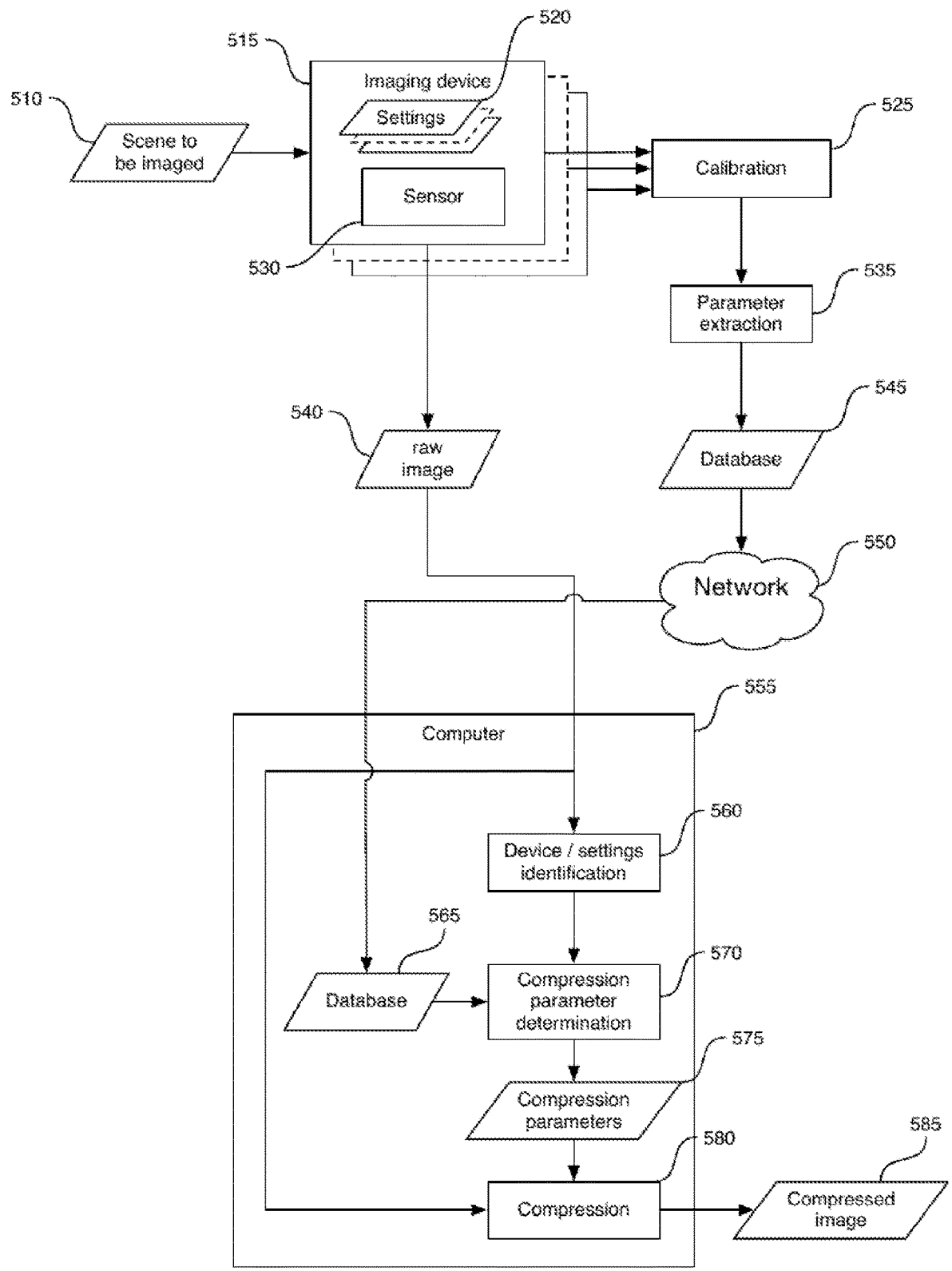
FIG. 4 illustrates an embodiment of a compression device adapted to implement a method according to the present invention using a compression parameter catalogue/database.

Furthermore, the present invention also pertains to a system or device equipped with such computer program means. In particular, such a device may comprise a microprocessor, a field-programmable gate array, an image sensor, image acquisition device, a mobile phone, in particular a smart phone equipped with a digital camera, a digital photo apparatus, a digital video camera, a scanning device, a tablet, a personal computer, a server, a medical imaging device, a microscope, a telescope, a satellite. FIG. 4 schematically and by way of example illustrates an embodiment of such a compression device adapted to implement a method according to the present invention using a compression algorithm and compression parameter catalogue/database. In the example illustrated in FIG. 4, wherein the compression device is chosen to be realized by a computer 555, the raw image data 540, delivered by an image acquisition device 515 after having taken a scene to be imaged 510, is transmitted to said computer 555, i.e., in general to the compression device, which then performs the identification step, the compression algorithm and compression parameter determination step, the compression step, and the output step. The catalogue initialization step, of course, has been performed beforehand and the catalogue-provisioning step is realized, in the example illustrated in FIG. 4, by providing a catalogue/database 565 directly in the computer 555. Alternatively, said catalogue/database 565 may also be provided by a network means 550 like the internet.

What is claimed is:

1. A method of compressing image data, comprising:
    an image data acquisition step for acquiring image data to be compressed for storage and/or transmission,
    a compression algorithm and compression parameter determination step for determining a compression algorithm and compression parameters to be used for compressing the acquired image data,
    a compression step for compressing the acquired image data by use of said compression algorithm and said compression parameters, and
    an output step for storing and/or transmitting the compressed image data,
    a catalogue provisioning step for providing a catalogue of types of image acquisition devices, of image acquisition devices, and/or of image sensors, and of associated compression algorithms and compression parameters, and
    an identification step for identifying a type of image acquisition device, an image acquisition device, and/or an image sensor of an image acquisition device having been used to acquire said image data to be compressed,
    wherein the step of determining a compression algorithm and compression parameters comprises use of said catalogue of types of image acquisition devices, of image acquisition devices, and/or of image sensors, and of associated compression algorithms and compression parameters, as well as use of the identified type of image acquisition device, image acquisition device, and/or image sensor of an image acquisition device having been used to acquire said image data to be compressed, such that said compression algorithm and compression parameters are determined by use of said catalogue depending on the previously-identified type of image acquisition device, image acquisition device, and/or image sensor of an image acquisition device which has been used to acquire said image data to be compressed.

2. The method according to claim 1, wherein the step of providing a catalogue of types of image acquisition devices, of image acquisition devices, and/or of image sensors, and of associated compression algorithms and compression parameters further comprises providing within said catalogue acquisition settings for each type of image acquisition devices, for each image acquisition device, and/or for each image sensor, and/or known requirements on the compression.

3. The method according to claim 1, wherein the step of identifying a type of image acquisition device, an image acquisition device, and/or an image sensor of an image acquisition device further comprises identifying acquisition settings having been used to acquire said image data to be compressed and/or identifying known requirements on the compression.

4. The method according to claim 1, wherein the step of identifying a type of image acquisition device, an image acquisition device, an image sensor of an image acquisition device, and/or acquisition settings having been used to acquire said image data to be compressed, and/or requirements on the compression is realized by:
    input by a user,
    inspection of metadata related to the image data to be compressed, processing and analyzing the image data to be compressed, in particular by analyzing a signal to noise structure of the image data to be compressed, or by any combination thereof.

5. The method according to claim 1, wherein the compression algorithm and compression parameter determination step outputs additional information which may be used in post-processing and/or stored or transferred for later use.

6. The method according to claim 1, further comprising:

a catalogue initialization step for generating said catalogue of types of image acquisition devices, of image acquisition devices, and/or of image sensors, and of associated compression algorithms and compression parameters, said catalogue initialization step being executed initially for generation of said catalogue and/or upon availability of further types of image acquisition devices, of image acquisition devices, and/or of image sensors.

7. The method according to claim 6, wherein the catalogue initialization step comprises the sub-steps of compiling a list of image sensor models, of image acquisition devices and/or of types of image acquisition devices using said image sensor models, associating to each of said image sensor models, each of said image acquisition devices and/or each of said types of image acquisition devices using said image sensor models a list of acquisition settings, performing a system calibration for each of said acquisition settings for each of said image sensor models, each of said image acquisition devices and/or each of said types of image acquisition devices using said image sensor models, assigning to each of said acquisition settings for each of said image sensor models, each of said image acquisition devices and/or each of said types of image acquisition devices using said image sensor models a set of a compression algorithm and compression parameters based on analysis of data obtained during said system calibration.

8. The method according to claim 7, wherein, in addition to the lists of image sensor models, of image acquisition devices and/or of types of image acquisition devices using said image sensor models, and the list of associated acquisition settings, said analysis of data obtained during the system calibration takes into account a list of requirements on the compression, such that assignment of a compression algorithm and compression parameters during the catalogue initialization step is realized depending on said requirements on the compression.

9. The method according to claim 1, wherein said catalogue is realized by:

a look-up-table directly comprising types of image acquisition devices, of image acquisition devices, and/or of image sensors, and/or of acquisition settings for each type of image acquisition devices, each image acquisition device, and/or each image sensor, and of associated compression algorithms and compression parameters, or a database comprising entries from which an appropriate compression algorithm and compression parameters may be derived at a later stage, or a combination thereof, said look-up-table or database being directly accessible in a device performing the compression and/or accessible through a network means.

10. The method according to claim 1, wherein the compression algorithm and compression parameter determination step and/or the catalogue initialization step are adapted for determining and/or initializing said compression algorithm and said compression parameters for each type of image acquisition devices, each image acquisition device, and/or each image sensor such as to provide for a normalized output of the compression step across different types of image acquisition devices, different image acquisition devices, and/or different image sensors.

11. The method according to claim 10, wherein the compressed image data delivered by the compression step represents the number of photons hitting each pixel.

12. The method according to claim 10, wherein the compressed image data delivered by the compression step represents the square-root of the number of photons for each pixel.

13. The method according to claim 10, wherein the compression step, next to generating normalized output in the form of normalized compressed image data, provides a look-up-table allowing to map normalized pixel values to pixel values representing original pixel values within the error introduced by the compression.

14. A non-transitory computer-readable recording medium storing a computer program adapted to implement the method according to claim 1.

15. A device equipped with the computer program according to claim 14, wherein the device is chosen from the group comprising a microprocessor, a field-programmable gate array, an image sensor, image acquisition device, a mobile phone, in particular a smart phone equipped with a digital camera, a digital photo apparatus, a digital video camera, a scanning device, a tablet, a personal computer, a server, a medical imaging device, a microscope, a telescope, and a satellite.

* * * * *